US012735041B2

(12) United States Patent
Zhu et al.

(10) Patent No.: US 12,735,041 B2
(45) Date of Patent: Sep. 15, 2026

(54) VEHICLE TRAVEL CONTROL METHOD AND APPARATUS

(71) Applicant: Apollo Intelligent Driving Technology (Beijing) Co., Ltd., Beijing (CN)

(72) Inventors: Bo Zhu, Beijing (CN); Sunan Deng, Beijing (CN); Yunfeng Liu, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 474 days.

(21) Appl. No.: 17/820,969

(22) Filed: Aug. 19, 2022

(65) Prior Publication Data

US 2023/0103040 A1 Mar. 30, 2023

(30) Foreign Application Priority Data

Sep. 30, 2021 (CN) .......................... 202111166550.7

(51) Int. Cl.
*B60W 30/18* (2012.01)
*B60W 50/00* (2006.01)

(52) U.S. Cl.
CPC .. *B60W 30/18154* (2013.01); *B60W 50/0098* (2013.01); *B60W 2050/0022* (2013.01);
(Continued)

(58) Field of Classification Search
CPC ....... B60W 30/18154; B60W 50/0098; B60W 2050/0022; B60W 2520/06;
(Continued)

(56) References Cited

U.S. PATENT DOCUMENTS

2017/0241794 A1* 8/2017 Koo ................... G08G 1/09623
2019/0204850 A1* 7/2019 Panzica ............. G01C 21/3658
(Continued)

FOREIGN PATENT DOCUMENTS

CN 110530393 A 12/2019
CN 111746559 A 10/2020
(Continued)

OTHER PUBLICATIONS

Notice of Allowance for corresponding Chinese Application No. 202111166550.7, dated Aug. 11, 2022, 4 pages.
(Continued)

*Primary Examiner* — Hitesh Patel
*Assistant Examiner* — Ashleigh Nicole Turnbaugh
(74) *Attorney, Agent, or Firm* — Tucker Ellis LLP

(57) ABSTRACT

The present disclosure provides a vehicle travel control method and apparatus. A specific implementation lies in: acquiring a distance between a vehicle and a first intersection, where the first intersection is an intersection for the vehicle to go across on a first road which the vehicle is currently on; acquiring, on a determination that the distance is less than or equal to a preset distance, intersection information of the first intersection and travelling information of the vehicle, where the intersection information includes lane information of at least two lanes on the first road; determining, according to the intersection information and the travelling information, a target weight of each of the lanes for the vehicle to travel into; and determining, according to the target weight of each of the lanes for the vehicle to travel into, an intended travel route of the vehicle.

16 Claims, 7 Drawing Sheets

(52) U.S. Cl.
CPC ..... *B60W 2520/06* (2013.01); *B60W 2552/05* (2020.02); *B60W 2552/10* (2020.02); *B60W 2556/10* (2020.02)

(58) Field of Classification Search
CPC ......... B60W 2552/05; B60W 2552/10; B60W 2556/10; B60W 2050/0043; B60W 50/00; B60W 60/001; G01C 21/28; G01C 21/3407
USPC ............................................................ 701/23
See application file for complete search history.

(56) References Cited

U.S. PATENT DOCUMENTS

| | | | | |
|---|---|---|---|---|
| 2022/0084400 | A1 * | 3/2022 | Wang | G08G 1/0112 |
| 2022/0258763 | A1 * | 8/2022 | Nimura | B60W 30/18159 |

FOREIGN PATENT DOCUMENTS

| | | | | | |
|---|---|---|---|---|---|
| CN | 111833633 | A | | 10/2020 | |
| CN | 111857160 | A | | 10/2020 | |
| CN | 112146671 | A | | 12/2020 | |
| CN | 112229418 | A | | 1/2021 | |
| CN | 112833903 | A | * | 5/2021 | G01C 21/34 |
| CN | 112839855 | A | | 5/2021 | |
| CN | 113428081 | A | | 9/2021 | |
| JP | 2017-165201 | A | | 9/2017 | |
| JP | 2018-021887 | A | | 2/2018 | |
| JP | 2021-117038 | A | | 8/2021 | |
| WO | 2015/052577 | A1 | | 4/2015 | |
| WO | 2021/059601 | A1 | | 4/2021 | |

OTHER PUBLICATIONS

Office Action for corresponding Chinese Application No. 202111166550.7, 12 pages.

European Search Report of corresponding European Application No. 22191997.0, dated Apr. 12, 2023, 8 pages.

Notice of Reasons for Refusal of corresponding Japanese Application No. 2022-059786, dated Feb. 9, 2023, 9 pages.

* cited by examiner

VEHICLE TRAVEL CONTROL METHOD AND APPARATUS

CROSS-REFERENCE TO RELATED APPLICATIONS

This application claims priority to Chinese Application No. CN 202111166550.7, filed on Sep. 30, 2021, which is hereby incorporated by reference in its entirety.

TECHNICAL FIELD

The present disclosure relates to the field of autonomous driving and intelligent transportation in computer technologies, and, in particular, to a vehicle travel control method and apparatus.

BACKGROUND

With the continuous development of vehicle related technology, in a travelling process of a vehicle, an on-board computer system typically predicts a travel route of the vehicle.

Currently, in a prior art, when predicting a travel route of a vehicle, a location of the vehicle in a road is usually determined according to location information of the vehicle, and for an area where there is an intersection, it is usually predicted that the vehicle will go straight across the intersection.

However, the implementation of directly predicting that a vehicle will go straight across an intersection results in relatively low prediction accuracy of a travel route of the vehicle.

SUMMARY

The present disclosure provides a vehicle travel control method and apparatus.

According to a first aspect of the present disclosure, provided is a vehicle travel control method, including:

- acquiring a distance between a vehicle and a first intersection, where the first intersection is an intersection for the vehicle to go across on a first road which the vehicle is currently on;
- acquiring, on a determination that the distance is less than or equal to a preset distance, intersection information of the first intersection and travelling information of the vehicle, where the intersection information includes lane information of at least two lanes on the first road;
- determining, according to the intersection information and the travelling information, a target weight of each of the lanes for the vehicle to travel into; and
- determining, according to the target weight of each of the lanes for the vehicle to travel into, an intended travel route of the vehicle.

According to a second aspect of the present disclosure, provided is a vehicle travel control apparatus, including:

- a first acquiring module, configured to acquire a distance between a vehicle and a first intersection, where the first intersection is an intersection for the vehicle to go across on a first road which the vehicle is currently on;
- a second acquiring module, configured to acquire, on a determination that the distance is less than or equal to a preset distance, intersection information of the first intersection and travelling information of the vehicle, where the intersection information includes lane information of at least two lanes on the first road;
- a first determining module, configured to determine, according to the intersection information and the travelling information, a target weight of each of the lanes for the vehicle to travel into; and
- a second determining module, configured to determine, according to the target weight of each of the lanes for the vehicle to travel into, an intended travel route of the vehicle.

According to a third aspect of the present disclosure, provided is an electronic device, including:

- at least one processor, and
- a memory communicatively connected with the at least one processor;
- where the memory has stored thereon instructions executable by the at least one processor, and the instructions, when executed by the at least one processor, enable the at least one processor to implement the method according to the first aspect.

According to a fourth aspect of the present disclosure, provided is a non-transitory computer readable storage medium on which computer instructions are stored, where the computer instructions are configured to enable the computer to execute the method according to the first aspect.

According to a fifth aspect of the present disclosure, provided is a computer program product including a computer program, where the computer program is stored in a readable storage medium from which the computer program is readable by at least one processor of an electronic device, and the method according to the first aspect is implemented by the electronic device when the computer program is executed by the at least one processor.

The technique according to the present disclosure solves the problem that route prediction is relatively low in accuracy.

It should be understood that the content described in this section is neither intended to identify key or important features of embodiments of the present disclosure, nor is used to limit the scope of the present disclosure. Other features of the present disclosure will become readily comprehensible through the following description.

BRIEF DESCRIPTION OF DRAWINGS

The drawings are intended to achieve a better understanding of the present solution and do not constitute a limitation of the present disclosure. Among them.

DESCRIPTION OF EMBODIMENTS

Exemplary embodiments of the present disclosure are explained hereunder in conjunction with the accompanying drawings, including various details of embodiments of the present disclosure helpful to understanding, which should be considered as being only exemplary. Therefore, those of ordinary skill in the art should recognize that various changes and modifications can be made to the embodiments described herein without departing from the scope and spirit of the present disclosure. Similarly, for clarity and conciseness, descriptions on well-known functions and structures are omitted in the following description.

For a better understanding of the technical solution of the present disclosure, further detailed introductions will be made hereunder to related technology which is referred to in the present disclosure.

With the continuous development of related technology of route planning for vehicles, a current on-board computer system will perform a prediction on a travel route of a vehicle in a travelling process of the vehicle. For example, in a location strategy algorithm of the on-board computer system, a most important strategy is based on a strategy in which route location takes precedence, where whether a route prediction is accurate influences general accuracy of location, where the route prediction refers to a prediction on a current travelling route of a present vehicle.

It should be understood that, through a prediction of a travelling route of a vehicle, traffic information, road information or the like of the corresponding travelling route may be acquired beforehand, and when a user travels to the corresponding travelling route subsequently, the traffic information, road information or the like of the current route may be provided to the user quickly and efficiently. In addition, through the prediction of the travelling route of the vehicle, when a deviation between the travelling route of the vehicle and a planned route is predicted, a re-planned route after the deviation may be quickly determined. Thus, the prediction of the travelling route of the vehicle is very contributive in a travelling process of the vehicle.

In a current prior art, when predicting a travelling route of a vehicle, the prediction of the travelling route of the vehicle typically relies on a manner of combining vehicle location and road data. In some complicated scenarios, such as an intersection, route prediction can only rely on some simple strategies to finish. A strategy generally adopted in the prior art is that the vehicle chooses travelling straight by default.

Figure 1:
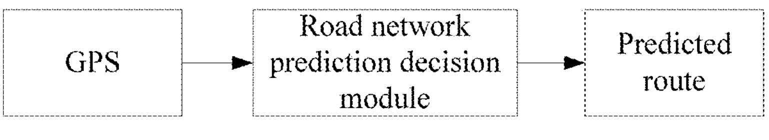
FIG. 1 is a schematic diagram of a processing unit in a related art according to an embodiment of the present disclosure.
Figure 2:
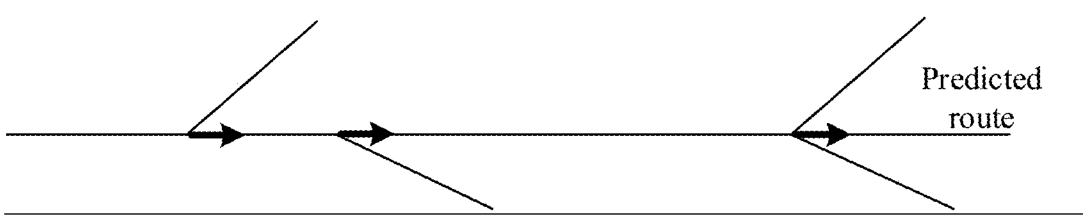
FIG. 2 is a schematic diagram of a route prediction in a related art according to an embodiment of the present disclosure.

For example, an introduction to an implementation in the prior art may be made in conjunction with FIG. 1 and FIG. 2. FIG. 1 is a schematic diagram of a processing unit in a related art according to an embodiment of the present disclosure, and FIG. 2 is a schematic diagram of a route prediction in a related art according to an embodiment of the present disclosure.

As shown in FIG. 1, when a route prediction is performed in the related art, an on-board computer system usually triggers a route predicting process through a road network prediction decision module as shown in FIG. 1, upon each reception of a GPS signal of a vehicle. Through the calculation by the road network prediction decision module, a predicted route can be acquired.

Further reference is made to FIG. 2 for understanding, when a prediction is performed in the prior art, a usual selection is a straight route. This implementation is feasible for a road section where only straight travelling is needed. However, for some complicated scenarios with intersections, if only a straight route is selected, relatively low prediction accuracy will be rendered for the travelling route of the vehicle. For example, in the implementation of FIG. 2, the road has multiple intersections therein, but a predicted route indicated by the straight arrows as shown in FIG. 2 will be predicted since the prior art implementation is mainly based on a prediction that the vehicle travels straight, thus it is impossible to guarantee the accuracy of the predicted travelling route of the vehicle.

In view of the problem in the prior art, the present disclosure proposes the following technical conception: for example, determining, according to travelling information of a vehicle and lane information of various lanes of a road, a respective weight of each of the lanes for the vehicle to travel into, and then determining a predicted travel route of the vehicle according to the weight, thereby the accuracy of the determined predicted route of the vehicle may be effectively improved.

Based on the above embodiment, a vehicle travel control method provided in the present disclosure is introduced hereunder with reference to specific embodiments. It is worth noting that the execution subject of the embodiments in the present disclosure may be, for example, a processor or a controller corresponding to an on-board computer system, or a cloud server A specific implementation of the execution subject is not limited in the embodiment, as long as it is capable of acquiring and processing related data to achieve the execution of the vehicle travel control method in the present disclosure.

Figure 3:
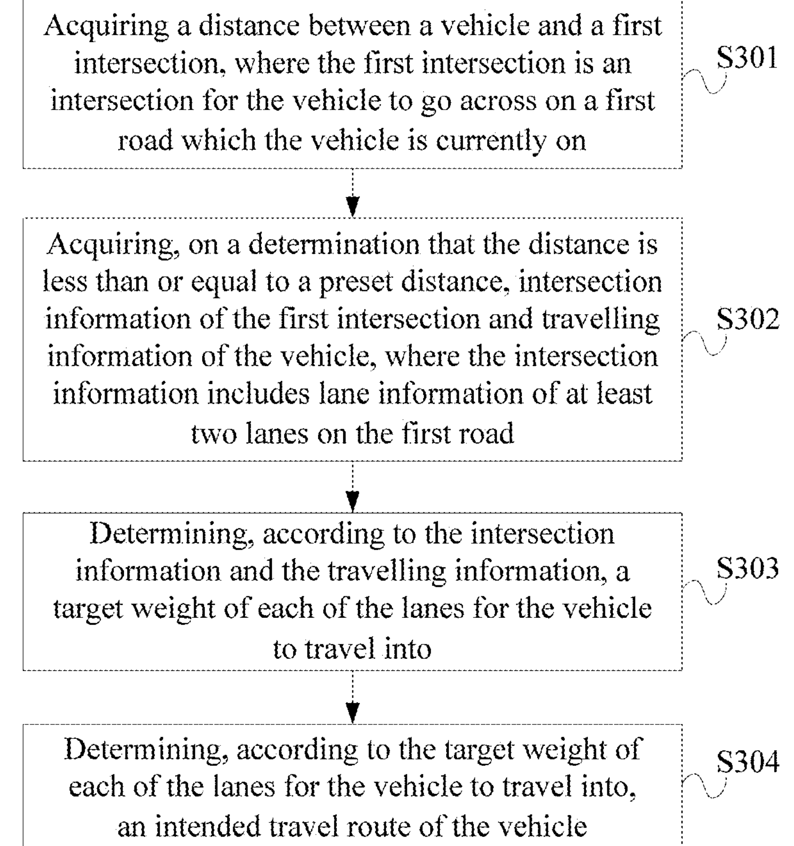
FIG. 3 is a first flowchart of a vehicle travel control method according to an embodiment of the present disclosure.

In the following, introduction is made in conjunction with FIG. 3 firstly. FIG. 3 is a first flowchart of a vehicle travel control method according to an embodiment of the present disclosure.

As shown in FIG. 3, the method includes:

S301, acquiring a distance between a vehicle and a first intersection, where the first intersection is an intersection for the vehicle to go across on a first road which the vehicle is currently on.

In a travelling process of a vehicle on a first road, for example, it is possible to acquire in real time a distance between a current location of the vehicle and a first intersection for the vehicle to go across on the first road.

In a possible implementation, for example, it is possible to acquire in real time the location of the vehicle, and acquire in real time a travelling direction of the vehicle, subsequently, for example, it is possible to determine, according to the location of the vehicle and the travelling direction of the vehicle, whether there is an intersection in front of the vehicle, and acquire the distance between the vehicle and the first intersection if there is an intersection.

It should be understood that, only in case of an intersection, the travelling route of the vehicle may change greatly. For a road section without an intersection, the vehicle only needs to keep travelling straight, thus there is no need to perform a prediction on a travelling route of the vehicle.

Therefore, in the embodiment, the distance between the vehicle and the first intersection may be acquired in real time when the vehicle is travelling on the first road including the first intersection. For example, the distance between the vehicle and the first intersection may be determined according to the location of the vehicle and the location of the first intersection.

S302, acquiring, on a determination that the distance is less than or equal to a preset distance, intersection information of the first intersection and travelling information of the vehicle, where the intersection information includes lane information of at least two lanes on the first road.

After the distance between the vehicle and the first intersection is acquired, it is possible to determine whether the distance between the vehicle and the first intersection is less than or equal to a preset distance, where a specific implementation of the preset distance may be selected according to a practical requirement, which is not limited in the embodiment.

Comprehensibly, if it is determined that the distance between the vehicle and the first intersection is greater than the preset distance, it indicates that there is still a certain distance between the vehicle and the first intersection currently; if a route prediction is performed at this time, it is impossible to guarantee accuracy of the prediction, instead, a waste of computational resources will be incurred.

Therefore, when it is determined that the distance between the vehicle and the first intersection is less than or equal to the preset distance, it is possible to determine that the vehicle is currently about to approach the first intersection, and thus a subsequent route predicting operation may be performed.

For example, the intersection information of the first intersection may be acquired on the determination that the distance between the vehicle and the first intersection is less than or equal to the preset distance. It should be understood that, for an intersection, there are at least two different travelling directions. Accordingly, in the embodiment, there are at least two lanes on the first road corresponding to the first intersection.

For example, the intersection information in the embodiment may include lane information of the at least two lanes on the first road. In a possible implementation, the lane information may include, for example, a position of each of the lanes and a lane direction of each of the lanes. For example, the lane direction of the lane may be straight travelling, left turning, right turning, or the like. When acquiring the lane information, for example, data is acquired from a preset storage unit.

In addition, in the embodiment, it is further possible to acquire travelling information of the vehicle. The travelling information of the vehicle in the embodiment may include pose data of the vehicle, that is, it may specifically include a travelling location and a travelling angle of the vehicle. The travelling angle here may be, for example, a heading angle of the vehicle.

In a practical implementation process, specific implementations of the intersection information of the first intersection and the travelling information of the vehicle may also be selected or expanded according to a practical requirement. Any road network information related to the first intersection may be used as the intersection information in the embodiment, and any information related to the travelling of the vehicle may be used as the travelling information in the embodiment. The specific implementations of the intersection information and the travelling information are not limited in the embodiment.

S303, determining, according to the intersection information and the travelling information, a target weight of each of the lanes for the vehicle to travel into.

After the intersection information and the travelling information are determined, it is possible to determine, according to the intersection information and the travelling information, a target weight of each of the lanes for the vehicle to travel into. The target weight here may, for example, indicate a probability of each of the lanes for the vehicle to travel into, that is, there is a correlation between the target weight and the probability.

In a possible implementation, for example, there may be a positive correlation between the target weight and the probability, that is, the greater the target weight is, the greater the probability of the current lane for the vehicle to travel into is; alternatively, for example, there may be a negative correlation between the target weight and the probability, that is, the smaller the target weight is, the greater the probability of the current lane for the vehicle to travel into is. A specific implementation of the correlation between the target weight and the probability may be selected according to a practical requirement, which is not limited in the embodiment.

The specific correlation between the target weight and the probability, for example, may depend on a manner how the target weight is determined. In a possible implementation, for example, the intersection information and the travelling information may be processed according to a preset formula to determine the target weight of each of the lanes for the vehicle to travel into. Alternatively, in an optional implementation, for example, the intersection information and the travelling information may be input into a preset model so that the preset model outputs the target weight of each of the lanes for the vehicle to travel into.

S304, determining, according to the target weight of each of the lanes for the vehicle to travel into, an intended travel route of the vehicle.

After the target weight of each of the lanes for the vehicle to travel into is determined, for example, it is possible to sort target weights, and then determine an intended travel route of the vehicle according to a sorted result.

In a possible implementation, for example, it is possible to determine a top-ranked lane to be the target lane for the vehicle to travel into, and then determine a route based on the target lane, thereby acquiring an intended travel route of the vehicle.

For example, if the target lane is a straight lane, it may be derived that the intended travel route of the vehicle is a straight route. For another example, if the target lane is a right-turning lane, it may be derived that the intended travel route of the vehicle is a route corresponding to right turning.

The vehicle travel control method provided in the embodiments of the present disclosure includes: acquiring a distance between a vehicle and a first intersection, where the first intersection is an intersection for the vehicle to go across on a first road which the vehicle is currently on; acquiring, on a determination that the distance is less than or equal to a preset distance, intersection information of the first intersection and travelling information of the vehicle, where the intersection information includes lane information of at least two lanes on the first road; determining, according to the intersection information and the travelling information, a target weight of each of the lanes for the vehicle to travel into; and determining, according to the target weight of each of the lanes for the vehicle to travel into, an intended travel route of the vehicle. By means of acquiring the distance between the vehicle and the first intersection, acquiring, on a determination that the vehicle is approaching the first intersection, the intersection information of the first intersection and the travelling information of the vehicle, and then determining, according to the lane information of each of the lanes and the travelling information, the target weight of each of the lanes for the vehicle to travel into, a respective target weight of each of the lanes for the vehicle to travel into may be determined in a lane-by-lane manner, and then the intended travel route of the vehicle is determined according to the target weight, thereby prediction on the travelling route of the vehicle may be effectively improved in accuracy.

Figure 4A:
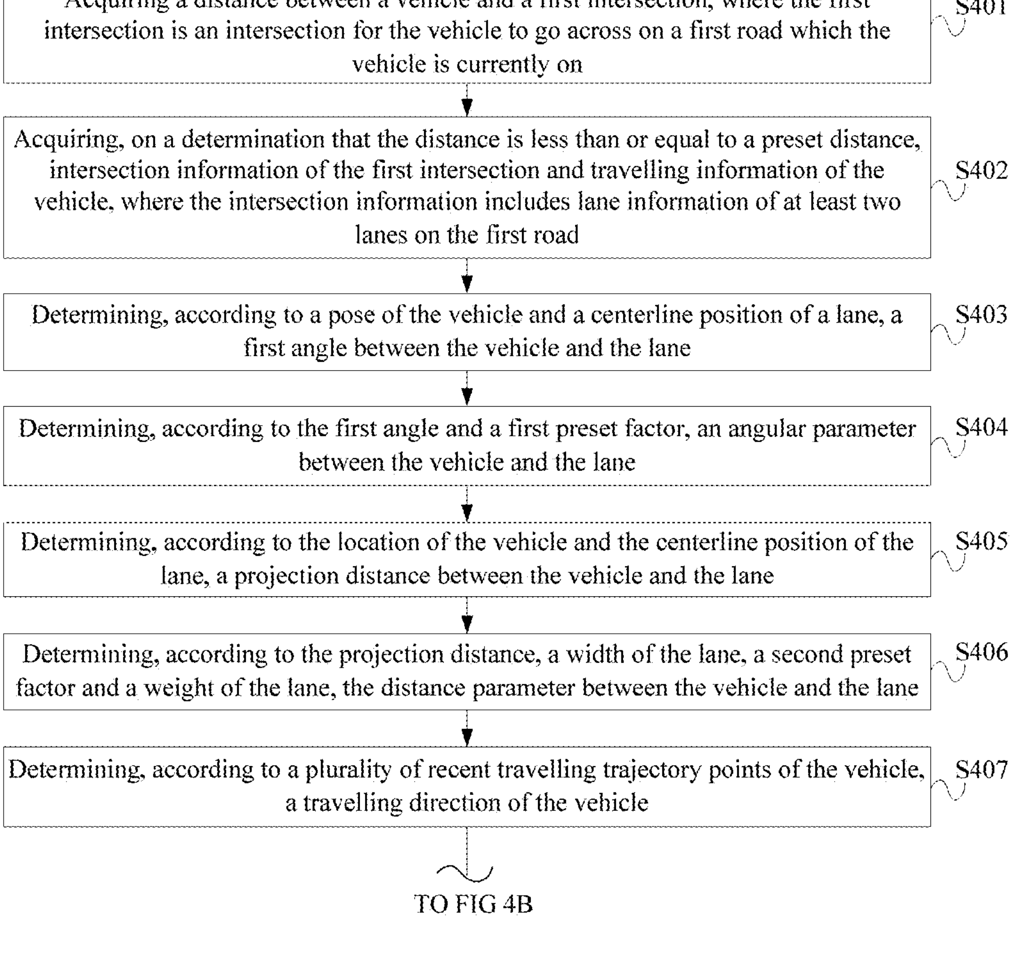
FIGS. 4A and 4B are second flowcharts of a vehicle travel control method according to an embodiment of the present disclosure.
Figure 4B:
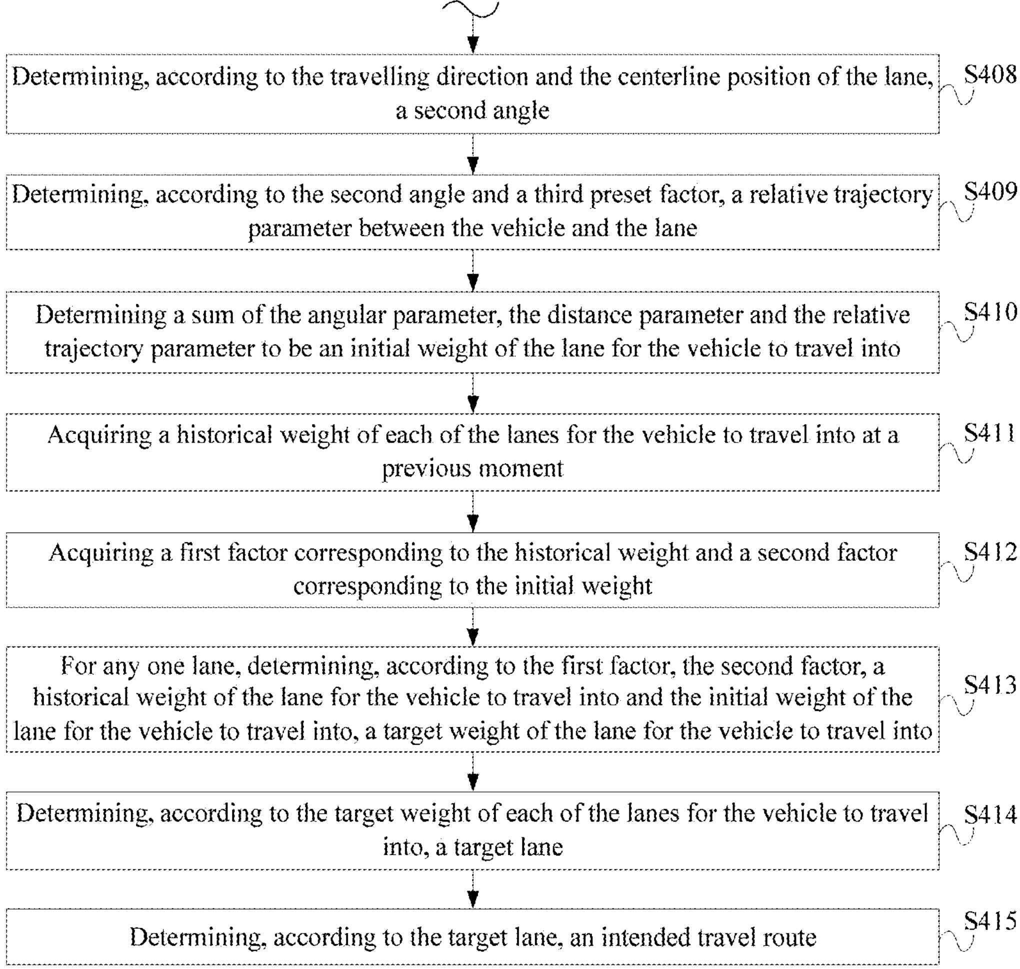
Figure 5:
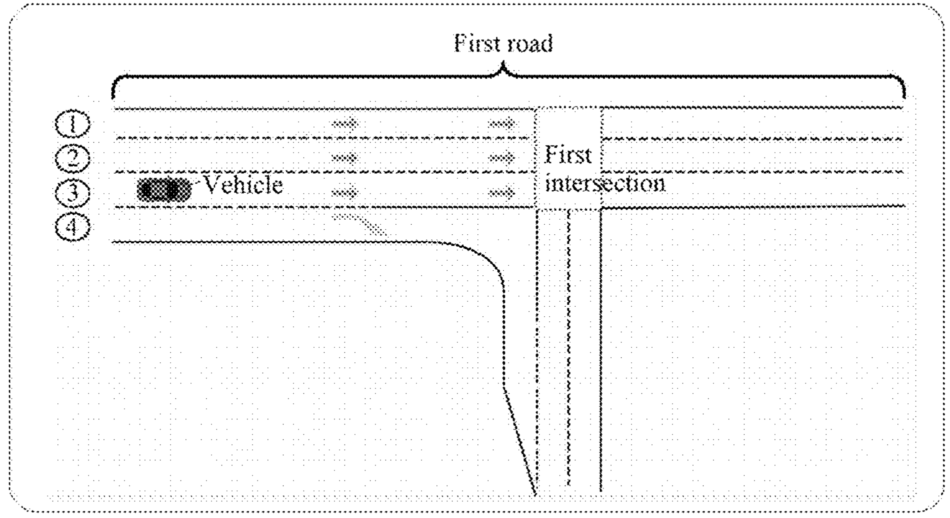
FIG. 5 is a schematic diagram of lanes of a first road according to an embodiment of the present disclosure.
Figure 6:
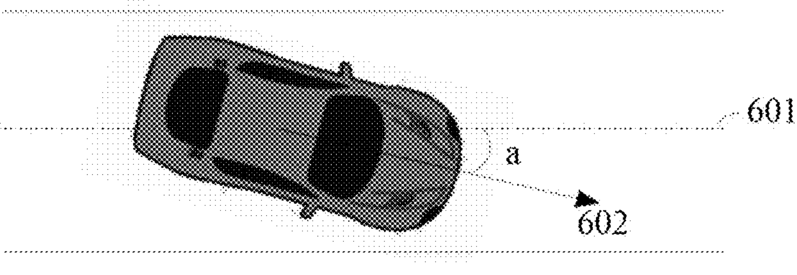
FIG. 6 is a schematic diagram of an implementation of determining a first angle according to an embodiment of the present disclosure.
Figure 7:
FIG. 7 is a schematic diagram of an implementation of determining a projection distance according to an embodiment of the present disclosure.
Figure 8:
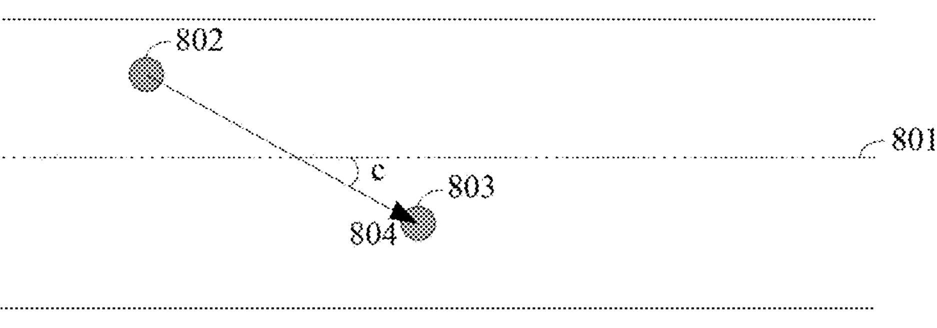
FIG. 8 is a schematic diagram of an implementation of determining a second angle according to an embodiment of the present disclosure.

Based on the foregoing embodiments, the vehicle travel control method according to the embodiments of the present disclosure will be further explained in detail hereunder in conjunction with FIGS. 4A, 4B, and FIG. 5 to FIG. 8. FIGS. 4A and 4B are second flowcharts of a vehicle travel control method according to an embodiment of the present disclosure; FIG. 5 is a schematic diagram of lanes of a first road according to an embodiment of the present disclosure; FIG. 6 is a schematic diagram of an implementation of determining a first angle according to an embodiment of the present disclosure; FIG. 7 is a schematic diagram of an implementation of determining a projection distance according to an embodiment of the present disclosure; and FIG. 8 is a schematic diagram of an implementation of determining a second angle according to an embodiment of the present disclosure.

As shown in FIGS. 4A and 4B, the method includes:

S401, acquiring a distance between a vehicle and a first intersection, where the first intersection is an intersection for the vehicle to go across on a first road which the vehicle is currently on.

The implementation of S401 is similar to that of S301 as introduced above, and details will not be described here again for a specific implementation.

For example, in conjunction with FIG. 5, the vehicle and the first intersection therein may be further introduced in detail regarding the implementations thereof. With reference to FIG. 5, provided that the vehicle is currently travelling on the first road as shown in FIG. 5. Based on FIG. 5, it can be determined that the first road includes the first intersection, where the first intersection is an intersection for the vehicle to go across on the first road which the vehicle is currently on, then the distance between the vehicle and the first intersection may be acquired in real time.

S402, acquiring, on a determination that the distance is less than or equal to a preset distance, intersection information of the first intersection and travelling information of the vehicle, where the intersection information includes lane information of at least two lanes on the first road.

The implementation of S402 is similar to that of S302 as introduced above, and details will not be described here again.

For example, the intersection information and the travelling information may be further introduced in detail in conjunction with FIG. 5. In a possible implementation, for example, it is possible to acquire, from road network data according to current location information of the vehicle, road network data of the first road which the vehicle is currently on, when it is determined that the distance between the vehicle and the first intersection is less than or equal to the preset distance. Moreover, in a possible implementation, the road network data carries a plurality of unordered links (road sections), subsequently, for example, taking the current location of the vehicle as a starting point, it is possible to construct the acquired links to obtain an orderly topological network structure which may also be interpreted as a road network formed by lane lines. For example, the specific position of each of the lane lines as shown in FIG. 5 may be acquired through the road network data construction.

After the position of each of the lane lines is determined, the lane information in the embodiment may further include a lane direction of each of the lane lines. In a possible implementation, data of lane directions may be stored in another separate table, for example.

Therefore, for example, it is possible to determine, according to an identification of the first intersection and an identification of each of the lanes (for example, Lane 1, Lane 2, Lane 3 and Lane 4 as shown in FIG. 5) corresponding to the first intersection included in the road network data as described above, the lane direction of each of the lanes corresponding to the first intersection from the corresponding table of the lane directions as introduced above.

After the lane direction and the lane position as described above are determined, a fusion may be performed based on the two portions of data to obtain the lane information of each of the lanes in the embodiment, where the lane information may include the lane position of each of the lanes and the lane direction of each of the lanes. The fusion result may be understood with reference to FIG. 5, for example. As shown in FIG. 5, for example, the lane position and the lane direction of Lane 1, the lane position and the lane direction of Lane 2, the lane position and the lane direction of Lane 3 and the lane position and the lane direction of Lane 4 corresponding to the first intersection may be currently determined.

S403, determining, according to a pose of the vehicle and a centerline position of a lane, a first angle between the vehicle and the lane.

In the embodiment, the travelling information of the vehicle may include the pose of the vehicle, where the pose may include a travelling location and a travelling angle of the vehicle, and the lane information in the embodiment includes a position of a lane line which, for example, may be a position of a centerline of the lane. It should be understood that the boundary lines of the lane and the centerline of the lane are all parallel, thus, the first angle between the vehicle and the lane may be determined according to the centerline position of the lane.

For example, reference may be made to FIG. 6 for understanding. As shown in FIG. 6, for example, for the lane as shown in FIG. 6, the centerline position of the lane determined is the position indicated by 601 in FIG. 6, and provided that the travelling direction of the vehicle as indicated by the pose of the vehicle is the direction indicated by arrow 602 in FIG. 6, then the first angle between the vehicle and the lane may be, for example, the angle indicated by angle a in FIG. 6.

In a practical implementation process, the first angle between the vehicle and the lane may be selected according to a practical requirement, which is not limited in the embodiment. Moreover, it should be understood that it is possible to determine first angles between the vehicle and respective lanes corresponding to the first intersection. If the respective lanes are parallel, the first angles between the vehicle and the respective lanes are the same.

S404, determining, according to the first angle and a first preset factor, an angular parameter between the vehicle and the lane.

After the first angle is determined, for example, it is possible to determine, according to the first angle and a first preset factor, an angular parameter between the vehicle and the lane.

In a possible implementation, the angular parameter may satisfy, for example, the following Formula 1:

$$W_{angle}=\text{factor}_{angle}\times(\cos(\pi-\text{diff}_{angle}))\quad\text{Formula 1}$$

where $W_{angle}$ is the angular parameter, and $\text{factor}_{angle}$ is the first preset factor, $\text{diff}_{angle}$ is the first angle. A specific implementation of the first preset factor may be selected according to a practical requirement, which is not limited in the embodiment.

In addition, in a practical implementation process, in determining the angular parameter, for example, an identical transformation of the foregoing Formula 1 or a formula obtained based on the foregoing Formula 1 and an additional related coefficient may be used to determine the angular parameter in the embodiment. A specific implementation of determining the angular parameter is not limited in the embodiment, as long as the angular parameter is determined according to the first angle and the first preset factor.

S405, determining, according to the location of the vehicle and the centerline position of the lane, a projection distance between the vehicle and the lane.

In addition, the travelling information in the embodiment may further include the location of the vehicle. Accordingly, in the embodiment, it is also possible to determine a projection distance between the vehicle and the lane according to the location of the vehicle and the centerline position of the lane. The projection distance here may also be interpreted as a vertical distance between the location of the vehicle and the centerline position of the lane.

For example, reference may be made to FIG. 7 for understanding. As shown in FIG. 7, provided that, for the lane shown in FIG. 7, the centerline position of the lane is the position indicated by 701 in FIG. 7, and provided that the location of the vehicle is the position indicated by 702 in FIG. 7, it may be determined based on the location of the vehicle and the centerline position of the lane that the projection distance between the vehicle and the lane is the distance indicated by b in FIG. 7.

It should be understood that each of the lanes has a different centerline position, so projection distances between the vehicle and respective lanes are determined, where the projection distances between the vehicle and the respective lanes are also different.

S406, determining, according to the projection distance, a width of the lane, a second preset factor and a weight of the lane, the distance parameter between the vehicle and the lane.

After the projection distance is determined, it is possible to determine, according to the projection distance, a width of the lane, a second preset factor and a weight of the lane, the distance parameter between the vehicle and the lane.

In a possible implementation, the distance parameter may satisfy, for example, the following Formula 2:

$$W_{projectDis}=\frac{\text{factor}_{projectDis}\times\left(projectDis-\frac{linkWidth}{2}\right)}{W_{dist}}\quad\text{Formula 2}$$

where $W_{projectDis}$ is the distance parameter, $\text{factor}_{projectDis}$ is the second preset factor, projectDis is the projection distance, linkWidth is the width of the lane, $W_{dist}$ is the weight of the lane. Specific implementations of the second preset factor and the weight of the lane may be selected according to a practical requirement, which is not limited in the embodiment.

In addition, in a practical implementation process, in determining the distance parameter, for example, an identical transformation of the foregoing Formula 2, or a formula obtained based on the foregoing Formula 2 and an additional related factor may be used to determine the distance parameter in the embodiment. A specific implementation of determining the distance parameter is not limited in the embodiment, as long as the distance parameter is determined according to the projection distance, the width of the lane, the second preset factor and the weight of the lane.

S407, determining, according to a plurality of recent travelling trajectory points of the vehicle, a travelling direction of the vehicle.

In addition, the travelling information in the embodiment may further include the plurality of recent travelling trajectory points of the vehicle, based on which the travelling direction of the vehicle may be determined. In a possible implementation, for example, it is possible to determine, according to a line connecting a trajectory point of the vehicle at a current moment and a trajectory point of the vehicle at a previous moment, the travelling direction of the vehicle. Alternatively, it is also possible to determine, according to a trajectory point of the vehicle at a current moment and a preset number of trajectory points of the vehicle before the current moment, the travelling direction of the vehicle. A specific implementation of the number of travelling trajectory points for determining the travelling direction of the vehicle is not limited in the embodiment.

For example, reference may be made to FIG. 8 for understanding. As shown in FIG. 8, provided that, for example, the travelling trajectory point of the vehicle at the current moment is located at 803 as shown in FIG. 8, and the travelling trajectory point of the vehicle at the previous moment is located at 802 as shown in FIG. 8, then the travelling direction of the vehicle such as the direction indicated by arrow 804 in FIG. 8 may be determined according to the line connecting the travelling trajectory point 803 and the travelling trajectory point 802, for example.

In a practical implementation process, a specific travelling direction of the vehicle may be determined according to a specific travelling trajectory of the vehicle, which is not limited in the embodiment.

S408, determining, according to the travelling direction and the centerline position of the lane, a second angle.

In addition, after the travelling direction of the vehicle is determined, it is also possible to determine the second angle according to the travelling direction of the vehicle and the centerline position of the lane. It should be understood that the boundary lines of the lane and the centerline of the lane are all parallel, thus the second angle between the travelling direction of the vehicle and the lane may be determined according to the centerline position of the lane.

For example, reference may be made to FIG. 8 for understanding. As shown in FIG. 8, for example, for the lane as shown in FIG. 8, the determined centerline position of the lane is the position indicated by dash line 801 in FIG. 8, and provided that the travelling direction of the vehicle is the direction indicated by arrow 804 in FIG. 8, then the second angle between the travelling direction of the vehicle and the lane may be, for example, the angle indicated by angle c in FIG. 8.

In a practical implementation process, the second angle between the travelling direction of the vehicle and the lane may be selected according to a practical requirement, which is not limited in the embodiment. Moreover, it should be understood that it is possible to determine second angles between the vehicle and respective lanes corresponding to the first intersection. If the respective lanes are all parallel, the second angles between the travelling direction of the vehicle and the respective lanes are the same.

S409, determining, according to the second angle and a third preset factor, a relative trajectory parameter between the vehicle and the lane.

After the second angle is determined, it is possible to determine, according to the second angle and a third preset factor, the relative trajectory parameter between the vehicle and the lane.

In a possible implementation, the relative trajectory parameter may satisfy, for example, the following Formula 3:

$$W_{lineAngle} = \text{factor}_{lineAngle} \times (\cos(\pi - \text{diff\_line\_angle}) + 1) \quad \text{Formula 3}$$

where $W_{lineAngle}$ is the relative trajectory parameter, $\text{factor}_{lineAngle}$ is the third preset factor, diff_line_angle is the second angle. A specific implementation of the third preset factor may be selected according to a practical requirement, which is not limited in the embodiment.

In addition, in a practical implementation process, in determining the relative trajectory parameter, for example, an identical transformation of the foregoing Formula 3, or a formula obtained based on the foregoing Formula 3 and an additional related factor may be used to determine the relative trajectory parameter in the embodiment. A specific implementation of determining the relative trajectory parameter is not limited in the embodiment, as long as the relative trajectory parameter is determined according to the second angle and the third preset factor.

S410, determining a sum of the angular parameter, the distance parameter and the relative trajectory parameter to be an initial weight of the lane for the vehicle to travel into.

After the angular parameter, the distance parameter and the relative trajectory parameter as described above are determined, for example, the angular parameter, the distance parameter and the relative trajectory parameter may be summed up to determine the initial weight of the lane for the vehicle to travel into.

For example, the initial weight may satisfy the following Formula 4:

$$W = W_{angle} + W_{projectDis} + W_{lineAngle} \quad \text{Formula 4}$$

where W is the initial weight, $W_{angle}$ is the angular parameter, $W_{projectDis}$ is the distance parameter, $W_{lineAngle}$ is the relative trajectory parameter.

It should be understood that, in the embodiment, the foregoing operations are executed with respect to each of the lanes of the first road on which the vehicle is currently travelling, thus a respective initial weight W corresponding to each of the lanes may be determined. For example, with respect to Lane 1, Lane 2, Lane 3 and Lane 4 as introduced in the above figure, $W_1$, $W_2$, $W_3$ and $W_4$ may be determined, respectively.

S411, acquiring a historical weight of each of the lanes for the vehicle to travel into at a previous moment.

It should be understood that, in the embodiment, the foregoing operations are executed for each moment when the location of the vehicle is acquired, such that the target weight of each of the lanes for the vehicle to travel into is determined. In determining the target weight at the current moment, processing may be performed according to the respective target weight corresponding to each of the lanes which is determined at the previous moment. Therefore, for example, it is possible to acquire the historical weight of each of the lanes for the vehicle to travel into at the previous moment.

It should be understood that the historical weight at the previous moment as introduced here is actually the target weight determined at the previous moment.

S412, acquiring a first factor corresponding to the historical weight and a second factor corresponding to the initial weight.

In addition, in the embodiment, it is also possible to acquire a first factor corresponding to the historical weight and a second factor corresponding to the initial weight, where the first factor and the second factor may be preset factors, specific settings for the first factor and the second factor may be selected according to a practical requirement.

S413, for any one lane, determining, according to the first factor, the second factor, a historical weight of the lane for the vehicle to travel into and the initial weight of the lane for the vehicle to travel into, a target weight of the lane for the vehicle to travel into.

After each of the items introduced above are determined, it is possible to determine respective target weights corresponding to respective lanes. It should be understood that the implementations of determining the target weights with respect to the various lanes are the same. The introduction is made here using any one lane as an example, for example, the target weight of the lane for the vehicle to travel into may be determined according to the first factor, the second factor, the historical weight of the lane for the vehicle to travel into and the initial weight of the lane for the vehicle to travel into.

In a possible implementation, the target weight may satisfy, for example, the following Formula 5:

$$W_n = W_{n-1} \times a + W \times b \quad \text{Formula 5}$$

where $W_{n-1}$ is the historical weight of the lane for the vehicle to travel into, a is the first factor, W is the initial weight of the lane for the vehicle to travel into, b is the second factor, $W_n$ is the target weight of the lane for the vehicle to travel into.

It should be understood that an identical transformation of the foregoing Formula 5, or a formula obtained based on an additional related factor may be used to determine the target weight.

The above introduction is directed at the implementation of determining the target weight with respect to any one lane. In a practical implementation process, the target weight of each lane for the vehicle to travel into may be determined. For the convenience of calculation, for example, the calculation may be made by means of a matrix.

Provided that there currently are four lanes of the foregoing example, namely Lane 1, Lane 2, Lane 3 and Lane 4, for example, reference may be made to the following Formula 6 for understanding:

$$\begin{matrix} W_{n_1} \\ W_{n_2} \\ W_{n_3} \\ W_{n_4} \end{matrix} = \begin{matrix} W_{(n-1)_1} \\ W_{(n-1)_2} \\ W_{(n-1)_3} \\ W_{(n-1)_4} \end{matrix} \times a + \begin{matrix} W_1 \\ W_2 \\ W_3 \\ W_4 \end{matrix} \times b \quad \text{Formula 6}$$

where in terms of the target weight, the historical weight and the initial weigh, they may all be indicated as a matrix of m rows and 1 column, where m is the number of lanes. For example, if there currently are four lanes, then the foregoing matrix is a matrix of 4 rows and 1 column.

where $$W_{n_1}$$

is the target weight of Lane 1 for the vehicle to travel into, $$W_{(n-1)_1}$$

is the historical weight of Lane 1 for the vehicle to travel into, and $W_1$ is the initial weight of Lane 1 for the vehicle to travel into; various implementations thereof are similar to those as introduced above, and details will not be described here again. The speed and efficiency of determining the target weight may be effectively improved by processing in the manner of a matrix.

S414, determining, according to the target weight of each of the lanes for the vehicle to travel into, a target lane.

After the target weight of each of the lanes for the vehicle to travel into is determined, it is possible to determine, according to the respective target weight corresponding to each of the lanes, a target lane.

In a possible implementation, if the target weight is directly proportional to a probability at which the vehicle travels on a present lane, that is, the greater the target weight is, the greater the probability at which the vehicle travels on the present lane is, then it is possible to determine a lane with a greatest target weight to be the target lane, for example.

Alternatively, if the target weight is inversely proportional to a probability at which the vehicle travels on a present lane, that is, the smaller the target weight is, the greater the probability at which the vehicle travels on the present lane is, then it is possible to determine a lane with a smallest target weight to be the target lane, for example. The relationship between the target weight and the probability is not limited in the embodiment, and it may be set according to a practical requirement, for example, it may depend on a specific manner for setting the target weight.

In a possible implementation, the meaning of the target weight determined in the foregoing implementation may be, for example, a weight at which the vehicle performs lane changing on the present lane. Then it may be determined that the greater the target weight is, indicating that the vehicle is more likely to perform lane changing on the present lane, correspondingly, the smaller the probability at which the vehicle keeps travelling on the present lane is. Accordingly, for example, a lane with a smallest target weight may be determined as the target lane.

S415, determining, according to the target lane, an intended travel route.

After the target lane is determined, it is possible to determine, according to the target lane, an intended travel route. For example, in the foregoing example as shown in FIG. 5, provided that Lane 3 is currently determined as the target lane, for example, it may be determined that the intended travel route of the vehicle is a straight route. Alternatively, provided that Lane 4 is currently determined as the target lane, for example, it may be determined that the intended travel route of the vehicle is a right turning route.

Therefore, in the embodiments of the present disclosure, when preforming a prediction on a travel route of a vehicle, a lane direction of a lane is considered as well to predict the travel route of the vehicle, such that route prediction of the vehicle may be effectively improved in accuracy.

According to the vehicle travel control method provided in the embodiments of the present disclosure, by means of: determining, according to information such as a distance and an angle between a vehicle and a lane, three portions of data including an angular parameter, a distance parameter and a relative trajectory parameter between the vehicle and the lane, determining an initial weight of a respective lane for the vehicle to travel into according to the three portions of data, and then determining a target weight of the respective lane for the vehicle to travel into according to the initial weight and a historical weight at a previous moment, it can be guaranteed effectively that the determined target weight can effectively indicate a probability at which the vehicle travels on the respective lane. Subsequently, by means of determining a target lane according to a respective target probability corresponding to the respective lane, and determining an intended travel route of the vehicle according to the target lane, the accuracy of a prediction on the travel route of the vehicle can be improved effectively.

Based on the foregoing embodiments, when determining the target lane according to the respective target weight corresponding to each of the lanes, for example, the target lane may be determined as well according to a weight at which the vehicle performs turning at the first intersection. This possible implementation will be explained hereunder in conjunction with FIG. 9 and FIG. 10, where FIG. 9 is a third flowchart of a vehicle travel control method according to an embodiment of the present disclosure, and FIG. 10 is a schematic diagram of an implementation of determining a candidate direction according to an embodiment of the present disclosure.

Figure 9:
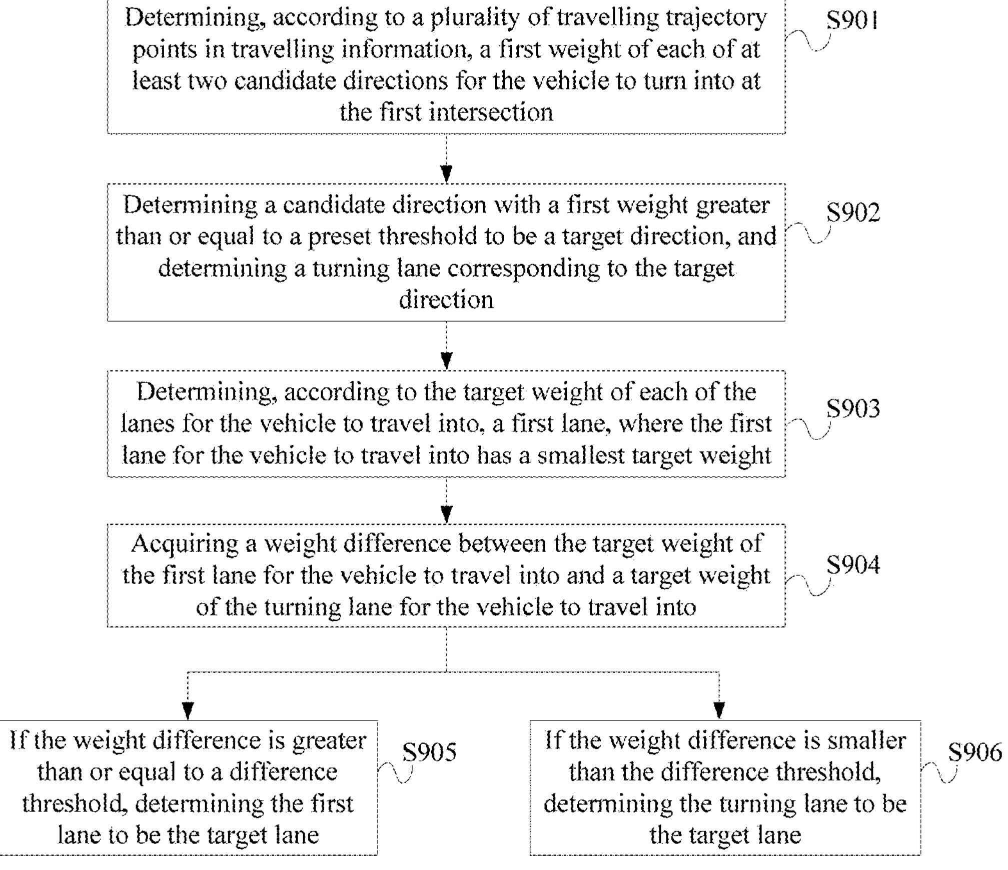
FIG. 9 a third flowchart of a vehicle travel control method according to an embodiment of the present disclosure.
Figure 10:
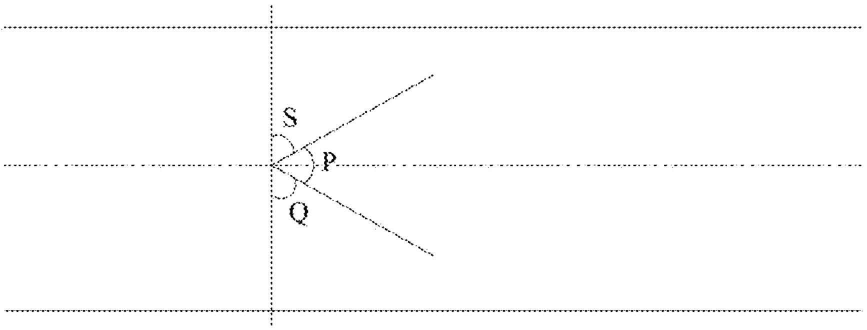
FIG. 10 is a schematic diagram of an implementation of determining a candidate direction according to an embodiment of the present disclosure.

As shown in FIG. 9, the method includes:

S901, determining, according to a plurality of travelling trajectory points in the travelling information, a first weight of each of at least two candidate directions for the vehicle to turn into at the first intersection.

In the embodiment, the travelling information of the vehicle may include a plurality of travelling trajectory points of the vehicle. For example, it is possible to determine, according to the plurality of trajectory points, a first weight of each of the candidate directions for the vehicle to turn into at the first intersection.

In a possible implementation of determining the first weight, for example, it is possible to determine, according to every two adjacent trajectory points of the plurality of trajectory points, a travelling direction of the vehicle. The travelling direction here may be interpreted as an angular tendency of the vehicle.

In addition, in the embodiment, the candidate directions may include, for example, a leftward direction, a centered direction and a rightward direction. Accordingly, with reference to FIG. 10, for example, a range of 180° perpendicular to a lane line may be equally divided into three sub ranges, which are respectively the ranges indicated by S, P and Q in FIG. 10. Subsequently, a range thereamong to which a current travelling angle of the vehicle belongs is determined. For example, when the travelling angle of the vehicle belongs to range S, it may be determined that a current angular tendency of the vehicle is the leftward direction. For another example, when the travelling angle of the vehicle belongs to range P, it may be determined that a current angular tendency of the vehicle is the centered direction. For one more example, when the travelling angle of the vehicle belongs to range Q, it may be determined that a current angular tendency of the vehicle is the rightward direction.

In a possible implementation, for example, it is possible to acquire, according to the plurality of travelling trajectory points in the travelling information, y consecutive angular tendencies so as to determine a weight corresponding to each of the directions, where y may be taken as 10, for example.

Accordingly, for example, in a process of determining a candidate direction according to an angular tendency for 10 times, where the candidate direction being the leftward direction accounts for 1 time, the candidate direction being the centered direction accounts for 1 time, and the candidate direction being the rightward direction accounts for 8 times. Accordingly, for example, it may be determined that the leftward direction corresponds to a weight of 0.1, and for another example, it may be determined that the centered direction corresponds to a weight of 0.1, and for one more example, it may be determined that the rightward direction corresponds to a weight of 0.8.

S902, determining a candidate direction with a first weight greater than or equal to a preset threshold to be a target direction, and determining a turning lane corresponding to the target direction.

After the respective first weight corresponding to each of the candidate directions is determined, for example, it is possible to compare the respective first weight with a preset threshold, and determine a candidate direction with a first weight greater than or equal to a preset threshold to be a target direction, where the preset threshold may be, for example, 0.5.

In a possible implementation, for example, as in the foregoing example, the weight of 0.8 which corresponds to the rightward direction is greater than the preset threshold of 0.5, thus the rightward direction may be determined to be the target direction. Subsequently, the turning lane corresponding to the target direction may be determined, for example, it may be determined that the right-turning lane corresponding to the rightward direction may be, for example, Lane 4 in the foregoing example.

S903, determining, according to the target weight of each of the lanes for the vehicle to travel into, a first lane, where the first lane for the vehicle to travel into has a smallest target weight.

In the embodiment, the respective target weight corresponding to each of the lanes is determined, accordingly, in a possible implementation, for example, it is possible to determine a lane with a smallest target weight to be the first lane. Alternatively, it is also possible to determine a lane with a greatest target weight to be a second lane. Here, the implementation of determining the first lane is similar to the introduced implementation of determining the target lane, which will not be repeated here.

S904, acquiring a weight difference between the target weight of the first lane for the vehicle to travel into and a target weight of the turning lane for the vehicle to travel into.

It should be understood that, in the foregoing description, determining the turning lane according to the first weight, practically means determining, according to the angular tendency of the vehicle, that the vehicle has a tendency to turn into the turning lane. In addition, in the foregoing description, the first lane is determined as well according to the target weight of each of the lanes.

In a possible implementation, the first lane and the turning lane may be the same lane, that is, the same lane is determined either according to the target weight of each of the lanes, or according to the turning tendency of the vehicle. In this condition, this lane is determined as the target lane directly.

However, in another possible implementation, the first lane and the turning lane may be different lanes. For example, Lane 3 is determined to be the first lane according to the target weight of each of the lanes, however, according to the turning tendency of the vehicle, it is considered that the vehicle has a right turning tendency, accordingly, for example, Lane 4 is determined to be the turning lane. Then, in the current situation, a choice between Lane 3 and Lane 4 is required.

For example, it is possible to acquire a weight difference between the target weight of the first lane for the vehicle to travel into and a target weight of the turning lane for the vehicle to travel into, so as to select, on a determination of the difference therebetween, the target lane from them.

S905, if the weight difference is greater than or equal to a difference threshold, determining the first lane to be the target lane.

In a possible implementation, if the difference between the target weight of the first lane for the vehicle to travel into and the target weight of the turning lane for the vehicle to travel into is greater than or equal to the difference threshold, it indicates that the difference between the target weights of the two lanes is relatively large. The turning tendency of the vehicle only provides an additional reference, but the target weight is a more accurate basis, accordingly, under such a circumstance, it is possible to determine the first lane, which is determined according to the target weight, to be the target lane.

S906, if the weight difference is smaller than the difference threshold, determining the turning lane to be the target lane.

In another possible implementation, if the difference between the target weight of the first lane for the vehicle to travel into and the target weight of the turning lane for the vehicle to travel into is smaller than the difference threshold, it indicates that the difference between the target weights of the two lanes is relatively small. In addition, with the turning tendency of the vehicle being an additional reference at this time, it is possible to determine the turning lane to be the target lane.

For example, in the example introduced above, although Lane 3 is determined to be the first lane according to the target weight, it is possible to determine Lane 4 to be the target lane since the difference between the target weights of Lane 3 and Lane 4 is relatively small and it is considered that the vehicle has a right turning tendency according to the turning tendency of the vehicle.

According to the vehicle travel control method provided in the embodiments of the present disclosure, by means of:

determining, according to a first weight of each of various candidate directions of a vehicle, a target direction from the candidate directions, determining a turning lane according to the target direction, and subsequently determining, according to a difference between a target weight of the turning lane which is determined according to a turning tendency of the vehicle and a target weight of a first lane which is determined according to a target weight of each of various lanes, an eventual target lane between the two lanes, the eventual target lane may be determined with the turning tendency of the vehicle being a reference, such that the accuracy of the predicted route of the vehicle may be further improved.

Figure 11:
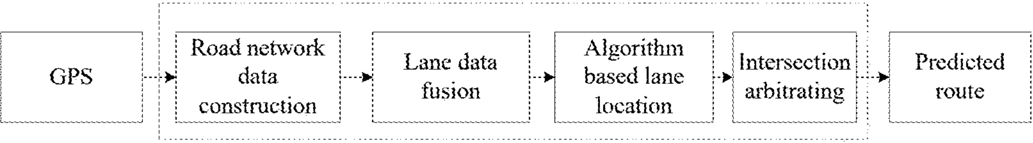
FIG. 11 is a schematic flowchart of a vehicle travel control method according to an embodiment of the present disclosure.

Based on the embodiments introduced above, the implementation process of the vehicle travel control method according to the present disclosure will be systematically explained hereunder in conjunction with FIG. 11. FIG. 11 is a schematic flowchart of a vehicle travel control method according to an embodiment of the present disclosure.

As shown in FIG. 11, after GPS data of a vehicle is acquired, for example, it is possible to perform road network data construction which refers to the implementation, as introduced in the foregoing embodiments, of constructing the unordered links into an orderly topological network structure. Based on this step, a position of a lane line may be determined. Subsequently, it is possible to perform lane data fusion. This section refers to the implementation, as introduced in the foregoing embodiments, of determining a lane direction of the lane line, and then determining a full volume of lane information according to the lane direction of the lane line and the position of the lane line.

After the lane information is determined, it is possible to perform algorithm based lane location. Such an implementation is corresponding to the implementation, as introduced in the foregoing embodiments, of performing algorithm based lane location on a vehicle, and calculating a target weight matrix. In a possible implementation, an intended travel route may be determined based on the target weight matrix, for the implementation thereof, reference may be made to the introduction in the foregoing embodiments, which will not be repeated here.

In addition, an intersection arbitrating unit is provided in the embodiment. In the intersection arbitrating unit, the implementation, as introduced in the foregoing embodiments, of determining the target lane between the turning lane and the first lane according to the manner introduced above may be realized. Based on the implementation of the intersection arbitrating unit, the accuracy of the determined intended travel route of the vehicle may be further improved. After processing with the various units described above, a predicted route of the vehicle, that is, the intended travel route as introduced in the foregoing embodiments, may be output.

Figure 12:
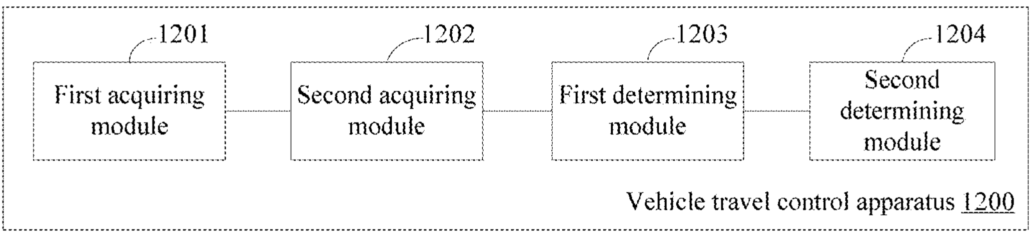
FIG. 12 is a schematic structural diagram of a vehicle travel control apparatus according to an embodiment of the present disclosure.

FIG. 12 is a schematic structural diagram of a vehicle travel control apparatus according to an embodiment of the present disclosure. As shown in FIG. 12, the vehicle travel control apparatus 1200 in the embodiment may include: a first acquiring module 1201, a second acquiring module 1202, a first determining module 1203 and a second determining module 1204.

The first acquiring module 1201 is configured to acquire a distance between a vehicle and a first intersection, where the first intersection is an intersection for the vehicle to go across on a first road which the vehicle is currently on.

The second acquiring module 1202 is configured to acquire, on a determination that the distance is less than or equal to a preset distance, intersection information of the first intersection and travelling information of the vehicle, where the intersection information includes lane information of at least two lanes on the first road.

The first determining module 1203 is configured to determine, according to the intersection information and the travelling information, a target weight of each of the lanes for the vehicle to travel into.

The second determining module 1204 is configured to determine, according to the target weight of each of the lanes for the vehicle to travel into, an intended travel route of the vehicle.

In a possible implementation, the first determining module 1203 is specifically configured to:

determine, according to lane information of each of the lanes in the intersection information and the travelling information, an initial weight of each of the lanes for the vehicle to travel into; and determine, according to the initial weight of each of the lanes for the vehicle to travel into and a historical weight of each of the lanes for the vehicle to travel into at a previous moment, the target weight of each of the lanes for the vehicle to travel into.

In a possible implementation, for any one lane of the at least two lanes, the first determining module 1203 is specifically configured to:

determine, according to the lane information of the lane and the travelling information, an angular parameter, a distance parameter and a relative trajectory parameter between the vehicle and the lane; and determine, according to the angular parameter, the distance parameter and the relative trajectory parameter, the initial weight of the lane for the vehicle to travel into.

In a possible implementation, the travelling information includes a pose of the vehicle, the lane information includes a centerline position of the lane, and the first determining module 1203 is specifically configured to:

determine, according to the pose of the vehicle and the centerline position of the lane, a first angle between the vehicle and the lane; and determine, according to the first angle and a first preset factor, the angular parameter between the vehicle and the lane.

In a possible implementation, the travelling information includes a location of the vehicle, the lane information includes a centerline position of the lane and a width of the lane, and the first determining module 1203 is specifically configured to:

determine, according to the location of the vehicle and the centerline position of the lane, a projection distance between the vehicle and the lane; and determine, according to the projection distance, the width of the lane, a second preset factor and a weight of the lane, the distance parameter between the vehicle and the lane.

In a possible implementation, the travelling information includes a plurality of recent travelling trajectory points of the vehicle, the lane information includes a centerline position of the lane, and the first determining module 1203 is specifically configured to:

determine, according to the plurality of recent travelling trajectory points of the vehicle, a travelling direction of the vehicle;

determine, according to the travelling direction and the centerline position of the lane, a second angle; and determine, according to the second angle and a third preset factor, the relative trajectory parameter between the vehicle and the lane.

In a possible implementation, the first determining module 1203 is specifically configured to:

determine a sum of the angular parameter, the distance parameter and the relative trajectory parameter to be the initial weight of the lane for the vehicle to travel into.

In a possible implementation, the first determining module 1203 is specifically configured to:

acquire the historical weight of each of the lanes for the vehicle to travel into at the previous moment; and determine, according to the initial weight of each of the lanes for the vehicle to travel into and the historical weight of each of the lanes for the vehicle to travel into at the previous moment, the target weight of each of the lanes for the vehicle to travel into.

In a possible implementation, for any one lane, the first determining module 1203 is specifically configured to:

acquire a first factor corresponding to the historical weight and a second factor corresponding to the initial weight; and determine, according to the first factor, the second factor, a historical weight of the lane for the vehicle to travel into and the initial weight of the lane for the vehicle to travel into, a target weight of the lane for the vehicle to travel into.

In a possible implementation, the second determining module 1204 is specifically configured to:

determine, according to the target weight of each of the lanes for the vehicle to travel into, a target lane; and determine, according to the target lane, the intended travel route.

In a possible implementation, the second determining module 1204 is specifically configured to:

determine a lane with a smallest target weight to be the target lane.

In a possible implementation, the second determining module 1204 is specifically configured to:

determine, according to a plurality of travelling trajectory points in the travelling information, a first weight of each of at least two candidate directions for the vehicle to turn into at the first intersection;

determine a candidate direction with a first weight greater than or equal to a preset threshold to be a target direction, and determine a turning lane corresponding to the target direction; and determine, according to the turning lane and the target weight of each of the lanes for the vehicle to travel into, the target lane.

In a possible implementation, the second determining module 1204 is specifically configured to:

determine, according to the target weight of each of the lanes for the vehicle to travel into, a first lane, where the first lane for the vehicle to travel into has a smallest target weight;

acquire a weight difference between the target weight of the first lane for the vehicle to travel into and a target weight of the turning lane for the vehicle to travel into;

if the weight difference is greater than or equal to a difference threshold, determine the first lane to be the target lane; and if the weight difference is smaller than the difference threshold, determine the turning lane to be the target lane.

The vehicle travel control method and apparatus according to the present disclosure are applicable to the field of autonomous driving and intelligent transportation in computer technologies to achieve an object of improving prediction accuracy of a route with respect to a vehicle.

In the technical solution of the present disclosure, the processing of a user's personal information, such as collection, storage, use, machining, transmission, provision and disclosure, comply with the provisions of related laws and regulations and does not offend public order and good morals.

According to embodiments of the present disclosure, the present disclosure further provides an electronic device, a readable storage medium and a computer program product.

According to an embodiment of the present disclosure, the present disclosure further provides a computer program product including a computer program, where the computer program is stored in a readable storage medium from which the computer program is readable by at least one processor of an electronic device, and the solution provided in any of the embodiments described above is implemented by the electronic device when the computer program is executed by the at least one processor.

Figure 13:
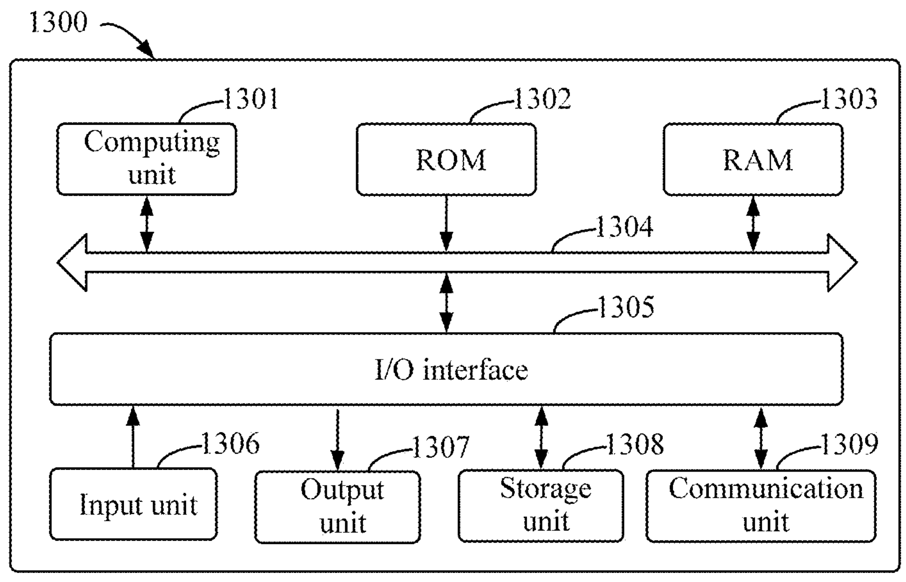
FIG. 13 is a block diagram of an electronic device for implementing a vehicle travel control method according to an embodiment of the present disclosure.

FIG. 13 shows a schematic block diagram of an exemplary electronic device 1300 which may be used to implement the embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital assistant, a cellular phone, a smart phone, a wearable device, and other similar computing devices. The components, and the connections, relationships and functions thereof are merely exemplary and are not intended to limit the implementations of the present disclosure described and/or claimed herein.

As shown in FIG. 13, the electronic device 1300 includes a computing unit 1301 that is capable of performing various appropriate actions or processes according to a computer program stored in a read only memory (ROM) 1302 or a computer program loaded from a storage unit 1308 into a random access memory (RAM) 1303. In the RAM 1303, various programs and data required for operations of the device 1300 may also be stored. The computing unit 1301, the ROM 1302 and the RAM 1303 are connected to each other via a bus 1304. An input/output (I/O) interface 1305 is also connected to the bus 1304.

A plurality of components in the device 1300 are connected to the I/O interface 1305, including: an input unit 1306, such as a keyboard, a mouse, etc.; an output unit 1307, such as various types of displays, speakers, etc.; the storage unit 1308, such as a magnetic disk, an optical disc, etc.; and a communication unit 1309, such as a network card, a modem, a wireless communication transceiver, etc. The communication unit 1309 allows the device 1300 to exchange information/data with other devices through a computer network such as the Internet and/or various telecommunication networks.

The computing unit 1301 may be various general-purpose and/or special-purpose processing components with processing and computing capabilities. Some examples of the computing unit 1301 include but not limited to, a central processing unit (CPU), a graphics processing unit (GPU), various dedicated artificial intelligence (AI) computing chips, various computing units for running machine learning model algorithms, a digital signal processor (DSP), and any appropriate processor, controller, microcontroller, etc. The computing unit 1301 executes various methods and processes described above, such as the vehicle travel control method. For example, in some embodiments, the vehicle travel control method may be implemented as a computer software program, which is tangibly contained in a machine-readable medium, such as the storage unit 1308. In some embodiments, a portion or an entirety of the computer program may be loaded and/or installed on the device 1300 via the ROM 1302 and/or the communication unit 1309. When the computer program is loaded into the RAM 1303 and executed by the computing unit 1301, one or more steps of the vehicle travel control method described above may be implemented. Alternatively, in other embodiments, the computing unit 1301 may be configured to perform the vehicle travel control method by any other appropriate means (for example, by means of firmware).

Various implementations of the systems and technologies described above may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software and/or a combination thereof. These various implementations may include: being implemented in one or more computer programs, where the one or more computer programs may be executed and/or interpreted on a programmable system including at least one programmable processor; the programmable processor may be a special-purpose or general-purpose programmable processor, which may receive data and instructions from a storage system, at least one input device and at least one output device and transmit the data and instructions to the storage system, the at least one input device, and the at least one output device.

Program codes for implementing the method of the present disclosure may be written in one or any combination of multiple programming languages. These program codes may be provided to a processor or a controller of a general-purpose computer, a special-purpose computer or other programmable data processing apparatus, such that when the program codes are executed by the processor or the controller, the functions/operations specified in the flowcharts and/or block diagrams are implemented. The program codes may be executed completely on a machine, partially on the machine, partially on the machine and partially on a remote machine as a separate software package, or completely on the remote machine or a server.

In the context of the present disclosure, the machine-readable medium may be a tangible medium that may contain or store programs to be used by an instruction executing system, apparatus or device, or used in combination with the instruction executing system, apparatus or device. The machine-readable medium may be a machine-readable signal medium or a machine-readable storage medium. The machine-readable medium may include but not limited to an electronic, magnetic, optical, electromagnetic, infrared, or semiconductor system, apparatus or device, or any suitable combination of the above. More specific examples of the machine-readable storage medium may include an electrical connection based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device or any suitable combination of the above.

In order to provide an interaction with a user, the systems and technologies described herein may be implemented on a computer having: a display device for displaying information to the user (for example, a CRT (cathode ray tube) or LCD (liquid crystal display) monitor); and a keyboard and pointing device (for example, a mouse or a trackball) through which the user may provide input to the computer. Other kinds of devices may also be used to provide an interaction with the user, for example, feedback provided to the user may be any form of sensory feedback (for example, visual feedback, auditory feedback, or tactile feedback); and the input from the user may be received in any form (including an acoustic input, a voice input or a tactile input).

The systems and technologies described herein may be implemented in a computing system that includes a background component, for example, as a data server, or a computing system that includes a middleware component, for example, an application server, or a computing system that includes a front-end component, for example, a user computer having a graphical user interface or a web browser through which a user may interact with the implementations of the systems and technologies described herein), or a computing system that includes any combination of such background component, middleware component, or front-end component. The components of the system may be connected to each other by digital data communication (for example, a communication network) in any form or medium. An example of the communication network includes a local area network (LAN), a wide area network (WAN), or the Internet.

A computing system may include a client and a server. The client and the server are generally far away from each other and typically interact through a communication network. The relationship between the client and the server is generated by running computer programs having a client-server relationship on corresponding computers. The server, which may be a cloud server, also known as a cloud computing server or a cloud host, is a host product in a cloud computing service system to solve the defects of management difficulties and weak business scalability that exist in a conventional physical host and a VPS ("virtual private server", or "VPS" for short) service. The server may also be a server of a distributed system, or a server combined with a blockchain.

It should be understood that various forms of processes as shown above may be used to reorder, add or delete a step. For example, the steps recorded in the present disclosure may be executed in parallel, sequentially or in other orders, which, as long as a desired result of the technical solution of the present disclosure is realized, is not limited herein.

The above specific embodiments do not constitute a limitation to the protection scope of the present disclosure. Those skilled in the art should understand that various modifications, combinations, sub-combinations and substitutions may be made according to design requirements and other considerations. Any modification, equivalent substitution and improvement made within the spirit and principles of the present disclosure shall be included in the protection scope of the present disclosure.

What is claimed is:

1. A vehicle travel control method, being applied to an electronic device and comprising:

acquiring a distance between a vehicle and a first intersection, wherein the first intersection is an intersection for the vehicle to go across on a first road which the vehicle is currently on;

acquiring, on a determination that the distance is less than or equal to a preset distance, intersection information of the first intersection and travelling information of the vehicle, wherein the intersection information comprises lane information of at least two lanes on the first road;

determining, according to the intersection information and the travelling information, a target weight of each of the at least two lanes for the vehicle to travel into;

determining, according to the target weight of each of the at least two lanes for the vehicle to travel into, an intended travel route of the vehicle; and controlling the vehicle to perform autonomous driving according to the intended travel route;

wherein determining, according to the target weight of each of the at least two lanes for the vehicle to travel into, the intended travel route of the vehicle comprises:

determining, according to the target weight of each of the at least two lanes for the vehicle to travel into, a target lane; and determining, according to the target lane, the intended travel route;

wherein determining, according to the target weight of each of the at least two lanes for the vehicle to travel into, the target lane comprises:

determining, according to a plurality of travelling trajectory points in the travelling information, a first weight of each of at least two candidate directions for the vehicle to turn into at the first intersection;

determining a candidate direction with a first weight greater than or equal to a preset threshold to be a target direction, and determining a turning lane corresponding to the target direction, wherein the turning lane is one of the at least two lanes for the vehicle to travel into; and determining, according to the turning lane and the target weight of each of the at least two lanes for the vehicle to travel into, the target lane;

wherein the first weight is a probability that a plurality of consecutive angular tendencies fall into each of at least two candidate directions, and the plurality of consecutive angular tendencies are obtained according to every two adjacent travelling trajectory points of the plurality of travelling trajectory points;

wherein the target weight is independent from the first weight.

2. The method according to claim 1, wherein determining, according to the intersection information and the travelling information, the target weight of each of the at least two lanes for the vehicle to travel into comprises:

determining, according to lane information of each of the at least two lanes in the intersection information and the travelling information, an initial weight of each of the at least two lanes for the vehicle to travel into; and determining, according to the initial weight of each of the at least two lanes for the vehicle to travel into and a historical weight of each of the at least two lanes for the vehicle to travel into at a previous moment, the target weight of each of the at least two lanes for the vehicle to travel into.

3. The method according to claim 2, wherein for a second lane which is any one lane of the at least two lanes, determining, according to lane information of the second lane and the travelling information, an initial weight of the second lane for the vehicle to travel into comprises:

determining, according to the lane information of the second lane and the travelling information, an angular parameter, a distance parameter and a relative trajectory parameter between the vehicle and the second lane; and determining, according to the angular parameter, the distance parameter and the relative trajectory parameter, the initial weight of the second lane for the vehicle to travel into.

4. The method according to claim 3, wherein the travelling information comprises a pose of the vehicle, the lane information comprises a centerline position of the second lane, and determining, according to the lane information of the second lane and the travelling information, the angular parameter between the vehicle and the second lane comprises:

determining, according to the pose of the vehicle and the centerline position of the second lane, a first angle between the vehicle and the second lane; and determining, according to the first angle and a first preset factor, the angular parameter between the vehicle and the second lane.

5. The method according to claim 3, wherein the travelling information comprises a plurality of recent travelling trajectory points of the vehicle, the lane information comprises a centerline position of the second lane, and determining, according to the lane information of the second lane and the travelling information, the relative trajectory parameter between the vehicle and the second lane comprises:

determining, according to the plurality of recent travelling trajectory points of the vehicle, a travelling direction of the vehicle;

determining, according to the travelling direction and the centerline position of the second lane, a second angle; and determining, according to the second angle and a third preset factor, the relative trajectory parameter between the vehicle and the second lane.

6. The method according to claim 3, wherein determining, according to the angular parameter, the distance parameter and the relative trajectory parameter, the initial weight of the second lane for the vehicle to travel into comprises:

determining a sum of the angular parameter, the distance parameter and the relative trajectory parameter to be the initial weight of the second lane for the vehicle to travel into.

7. The method according to claim 4, wherein determining, according to the angular parameter, the distance parameter and the relative trajectory parameter, the initial weight of the second lane for the vehicle to travel into comprises:

determining a sum of the angular parameter, the distance parameter and the relative trajectory parameter to be the initial weight of the second lane for the vehicle to travel into.

8. The method according to claim 5, wherein determining, according to the angular parameter, the distance parameter and the relative trajectory parameter, the initial weight of the second lane for the vehicle to travel into comprises:

determining a sum of the angular parameter, the distance parameter and the relative trajectory parameter to be the initial weight of the second lane for the vehicle to travel into.

9. The method according to claim 2, wherein determining, according to the initial weight of each of the at least two lanes for the vehicle to travel into and the historical weight of each of the at least two lanes for the vehicle to travel into at the previous moment, the target weight of each of the at least two lanes for the vehicle to travel into comprises:

acquiring the historical weight of each of the at least two lanes for the vehicle to travel into at the previous moment; and determining, according to the initial weight of each of the at least two lanes for the vehicle to travel into and the historical weight of each of the at least two lanes for the vehicle to travel into at the previous moment, the target weight of each of the at least two lanes for the vehicle to travel into.

10. The method according to claim 3, wherein determining, according to the initial weight of each of the at least two lanes for the vehicle to travel into and the historical weight of each of the at least two lanes for the vehicle to travel into at the previous moment, the target weight of each of the at least two lanes for the vehicle to travel into comprises:

acquiring the historical weight of each of the at least two lanes for the vehicle to travel into at the previous moment; and determining, according to the initial weight of each of the at least two lanes for the vehicle to travel into and the historical weight of each of the at least two lanes for the vehicle to travel into at the previous moment, the target weight of each of the at least two lanes for the vehicle to travel into.

11. The method according to claim 4, wherein determining, according to the initial weight of each of the at least two lanes for the vehicle to travel into and the historical weight of each of the at least two lanes for the vehicle to travel into at the previous moment, the target weight of each of the at least two lanes for the vehicle to travel into comprises:

acquiring the historical weight of each of the at least two lanes for the vehicle to travel into at the previous moment; and determining, according to the initial weight of each of the at least two lanes for the vehicle to travel into and the historical weight of each of the at least two lanes for the vehicle to travel into at the previous moment, the target weight of each of the at least two lanes for the vehicle to travel into.

12. The method according to claim 9, wherein for a second lane which is any one lane of the at least two lanes, determining, according to the initial weight of each of the at least two lanes for the vehicle to travel into and the historical weight of each of the at least two lanes for the vehicle to travel into at the previous moment, the target weight of each of the at least two lanes for the vehicle to travel into comprises:

acquiring a first factor corresponding to the historical weight and a second factor corresponding to the initial weight; and determining, according to the first factor, the second factor, a historical weight of the second lane for the vehicle to travel into and the initial weight of the second lane for the vehicle to travel into, a target weight of the second lane for the vehicle to travel into.

13. The method according to claim 1, wherein determining, according to the target weight of each of the lanes for the vehicle to travel into, the target lane comprises:

determining a lane with a smallest target weight to be the target lane.

14. The method according to claim 1, wherein determining, according to the turning lane and the target weight of each of the at least two lanes for the vehicle to travel into, the target lane comprises:

determining, according to the target weight of each of the at least two lanes for the vehicle to travel into, a first lane, wherein the first lane for the vehicle to travel into has a smallest target weight;

acquiring a weight difference between the target weight of the first lane for the vehicle to travel into and a target weight of the turning lane for the vehicle to travel into;

if the weight difference is greater than or equal to a difference threshold, determining the first lane to be the target lane; and if the weight difference is smaller than the difference threshold, determining the turning lane to be the target lane.

15. An electronic device, comprising:

at least one processor, and a memory communicatively connected with the at least one processor;

wherein the memory has stored thereon instructions executable by the at least one processor, and the instructions, when executed by the at least one processor, enable the at least one processor to implement the steps of:

acquiring a distance between a vehicle and a first intersection, wherein the first intersection is an intersection for the vehicle to go across on a first road which the vehicle is currently on;

acquiring, on a determination that the distance is less than or equal to a preset distance, intersection information of the first intersection and travelling information of the vehicle, wherein the intersection information comprises lane information of at least two lanes on the first road;

determining, according to the intersection information and the travelling information, a target weight of each of the at least two lanes for the vehicle to travel into;

determining, according to the target weight of each of the at least two lanes for the vehicle to travel into, an intended travel route of the vehicle; and controlling the vehicle to perform autonomous driving according to the intended travel route;

wherein determining, according to the target weight of each of the at least two lanes for the vehicle to travel into, the intended travel route of the vehicle comprises:

determining, according to the target weight of each of the at least two lanes for the vehicle to travel into, a target lane; and determining, according to the target lane, the intended travel route;

wherein determining, according to the target weight of each of the at least two lanes for the vehicle to travel into, the target lane comprises:

determining, according to a plurality of travelling trajectory points in the travelling information, a first weight of each of at least two candidate directions for the vehicle to turn into at the first intersection;

determining a candidate direction with a first weight greater than or equal to a preset threshold to be a target direction, and determining a turning lane corresponding to the target direction, wherein the turning lane is one of the at least two lanes for the vehicle to travel into; and determining, according to the turning lane and the target weight of each of the at least two lanes for the vehicle to travel into, the target lane;

wherein the first weight is a probability that a plurality of consecutive angular tendencies fall into each of at least two candidate directions, and the plurality of consecutive angular tendencies are obtained according to every two adjacent travelling trajectory points of the plurality of travelling trajectory points;

wherein the target weight is independent from the first weight.

16. A non-transitory computer readable storage medium on which computer instructions are stored, wherein the computer instructions are configured to enable a computer to execute the steps of:

acquiring a distance between a vehicle and a first intersection, wherein the first intersection is an intersection for the vehicle to go across on a first road which the vehicle is currently on;

acquiring, on a determination that the distance is less than or equal to a preset distance, intersection information of the first intersection and travelling information of the vehicle, wherein the intersection information comprises lane information of at least two lanes on the first road;

determining, according to the intersection information and the travelling information, a target weight of each of the at least two lanes for the vehicle to travel into;

determining, according to the target weight of each of the at least two lanes for the vehicle to travel into, an intended travel route of the vehicle; and controlling the vehicle to perform autonomous driving according to the intended travel route;

wherein determining, according to the target weight of each of the at least two lanes for the vehicle to travel into, the intended travel route of the vehicle comprises:

determining, according to the target weight of each of the at least two lanes for the vehicle to travel into, a target lane; and determining, according to the target lane, the intended travel route;

wherein determining, according to the target weight of each of the at least two lanes for the vehicle to travel into, the target lane comprises:

determining, according to a plurality of travelling trajectory points in the travelling information, a first weight of each of at least two candidate directions for the vehicle to turn into at the first intersection;

determining a candidate direction with a first weight greater than or equal to a preset threshold to be a target direction, and determining a turning lane corresponding to the target direction, wherein the turning lane is one of the at least two lanes for the vehicle to travel into; and determining, according to the turning lane and the target weight of each of the at least two lanes for the vehicle to travel into, the target lane;

wherein the first weight is a probability that a plurality of consecutive angular tendencies fall into each of at least two candidate directions, and the plurality of consecutive angular tendencies are obtained according to every two adjacent travelling trajectory points of the plurality of travelling trajectory points;

wherein the target weight is independent from the first weight.

* * * * *